United States Patent Office 2,740,802
Patented Apr. 3, 1956

2,740,802

DI (TRIHALOSILYL) ALKENES AND METHOD FOR PREPARATION THEREOF

George H. Wagner, Kenmore, and Arthur N. Pines, Snyder, N. Y., assignors to Union Carbide and Carbon Corporation, a corporation of New York No Drawing. Application December 13, 1952, Serial No. 325,888

14 Claims. (Cl. 260—448.2)

This invention relates to novel halogen-containing organosilicon compounds and to a process for preparing such compounds. More particularly, the invention is concerned with halogen-containing organosilicon compounds having the following formulas:

(I) 

wherein X represents a halogen atom and —R— represents a straight-chain hydrocarbon radical containing from 2 to 5 carbon atoms and having a single double bond therein.

(II) 

wherein X represents a halogen atom and R represents a straight-chain hydrocarbon radical containing from 2 to 5 carbon atoms and having a single double bond therein.

The compounds disclosed by the above formulas are termed di(trihalosilyl)alkenes. In Formula I each of the halosilyl radicals is connected to a terminal carbon atom of the unsaturated straight-chain hydrocarbon radical, and in Formula II each of the halosilyl radicals is connected to the same terminal carbon atom of the unsaturated straight-chain hydrocarbon radical.

The compounds of our invention may be prepared by dehydrohalogenating a di(trihalosilyl)haloalkane, for example, 1,1-di(trichlorosilyl)chloroethane and 1,2-di(trichlorosilyl)chloroethane. Such starting compounds are prepared from the reaction between trichlorosilane and beta-chlorovinyltrichlorosilane. This reaction results in the production of both the 1,1-di- and the 1,2-di-(trichlorosilyl) chloroethanes. The 1,2-di(trichlorosilyl)-chloroethane may also be prepared by chlorinating di(trichlorosilyl)ethane using ultraviolet light as a catalyst.

Dehydrohalogenation is accomplished in the present invention by heating the halo-substituted organohalosilane in the presence of aluminum chloride. The amount of catalyst employed is not critical, and therefore from about 0.2% to about 5% by weight of the halo-substituted organohalosilane may be used. Greater amounts of the catalyst may be employed. However, such amounts do not materially increase the yield of the reaction. The temperature employed for dehydrohalogenating di(trihalosilyl)haloalkanes in the presence of aluminum chloride may vary from about 100° C. to about 200° C. However, it has been found convenient to employ reflux temperatures, as at such temperatures the lower-boiling products are evolved from the reaction mixture and may therefore be readily collected.

The following examples more fully disclose the invention:

Example 1

To a 300-cc. kettle equipped with a thermometer well, the following were added: 175 grams 1,2-di(trichlorosilyl)chloroethane and 0.5 gram aluminum chloride. The kettle was then connected to a 12-plate column designed to operate at reduced pressure. The kettle temperature and the pressure on the system were gradually increased until a temperature of 180° C. was attained. At this point dehydrochlorination occurred (as determined by a temperature rise in the soda lime tower protecting the vacuum pump). The pressure was gradually increased to 740 mm. Hg to increase the rate of the reaction. A total of 161 grams of dehydrochlorinated material boiling between 180° to 185° C. was made to the receiver. Further distillation of this product together with an analysis resulted in its identification as the cis and trans isomers of 1,2-di(trichlorosilane)ethylene.

The properties of 1,2-di(trichlorosilyl)ethylene isomers are as follows:

|  | trans isomer | cis isomer |
| --- | --- | --- |
| Boiling point | 191° C | 187° C. |
| Density | Solid at room temperature | 1.58 gm./cc. at 25° C. |
| Refractive index | ----do---- | 1.4939 N$_D^{20}$. |
| Melting point | 36° C | approx. —28° C. |

Example 2

Trichlorosilane and beta-chlorovinyltrichlorosilane were reacted and there were obtained 148 grams of product comprising a mixture of 1,1- and 1,2-di(trichlorosilyl)-chloroethanes. The product was placed in a 300-cc. kettle equipped with a thermometer well, and there was added 0.20 gram of aluminum chloride. The kettle was attached to a 12-plate column designed to operate at reduced pressures. A partial vacuum was drawn on a system and the contents of the kettle heated to reflux. Because dehydrochlorination was very slow (as observed by heat change in the soda lime trap protecting the pump), the kettle was cooled and an additional 0.8 gram aluminum chloride added. Heating was resumed at 85 mm. Hg. The pressure was then adusted so that the kettle refluxed at 195° C., at which point dehydrochlorination occurred. A total of 134 grams of product was made to the receiver. Further distillation of this product together with an analysis resulted in the identification of the cis and trans isomers of 1,2-di(trichlorosilyl)ethylene and the 1,1-di(trichlorosilyl)ethylene.

The properties of 1,1-di(trichlorosilyl)ethylene are as follows:

Boiling point _____ 189° C.
Density _____ 1.51 at 25° C.
Refractive index _____ 1.487
Melting point _____ Below —80° C.

Other di(trihalosilyl)alkenes may be prepared by the above-described process. Such may be readily accomplished by employing the appropriate di(trihalosilyl)haloalkane, for example, di(trihalosilyl)halopropane, halobutane, and halopentane, under the conditions set forth.

The novel compounds of our invention have been found useful as raw materials for hydrolysis and condensation reactions to form polymers containing both silicon atoms joined by oxygen atoms and silicon atoms joined by unsaturated hydrocarbon linkages. Moreover, these compounds may be employed as a starting material for organosilicon syntheses by reacting the carbon to carbon double bond with a silicon to hydrogen bond of a silane.

We claim:

1. Process of dehydrohalogenating a di(trihalosilyl)-monohaloalkane containing from 2 to 5 carbon atoms which comprises heating said haloalkane in the presence of aluminum chloride at a temperature of from about 100° C. to about 200° C.

2. Process of dehydrohalogenating a di(trihalosilyl)-monohaloalkane containing from 2 to 5 carbon atoms which comprises heating said haloalkane in the presence of aluminum chloride at reflux temperatures.

3. Process of dehydrochlorinating a di(trichlorosilyl)-monochloroalkane containing from 2 to 5 carbon atoms which comprises heating said chloroalkane in the presence of aluminum chloride at a temperature of from about 100° C. to about 200° C.

4. Process of dehydrochlorinating a di(trichlorosilyl)-monochloroalkane containing from 2 to 5 carbon atoms which comprises heating said chloroalkane in the presence of aluminum chloride at reflux temperatures.

5. Process of dehydrochlorinating di(trichlorosilyl)-chloroethane which comprises heating said chloroethane in the presence of aluminum chloride at a temperature of from about 100° C. to about 200° C.

6. Process of dehydrochlorinating di(trichlorosilyl)-chloroethane which comprises heating said chloroethane in the presence of aluminum chloride at reflux temperatures.

7. An organosilicon compound having the following formula:

$$X_3Si—R—SiX_3$$

wherein X represents a halogen atom, and —R— represents a straight-chain hydrocarbon radical containing from 2 to 5 carbon atoms, said hydrocarbon radical having only two of the said carbon atoms connected by a double bond and each of said carbon atoms of said hydrocarbon radical having at least one hydrogen atom bonded thereto.

8. An organosilicon compound having the following formula:

$$Cl_3Si—R—SiCl_3$$

wherein —R— represents a straight-chain hydrocarbon radical containing from 2 to 5 carbon atoms, said hydrocarbon radical having only two of said carbon atoms connected by a double bond and each of said carbon atoms of said hydrocarbon radical having at least one hydrogen atom bonded thereto.

9. 1,2-di(trichlorosilyl)ethylene.
10. Trans-1,2-di(trichlorosilyl)ethylene.
11. Cis-1,2-di(trichlorosilyl)ethylene.
12. An organosilicon compound having the following formula:

wherein X represents a halogen atom and R represents a straight-chain hydrocarbon radical containing from 2 to 5 carbon atoms, said hydrocarbon radical having only two of said carbon atoms connected by a double bond, the $SiX_3$ radicals being connected to the same terminal carbon atom of the hydrocarbon.

13. An organosilicon compound having the following formula:

wherein R represents a straight-chain hydrocarbon radical containing from 2 to 5 carbon atoms, said hydrocarbon radical having only two of said carbon atoms connected by a double bond, the $SiCl_3$ radicals being connected to the same terminal carbon atom of the hydrocarbon.

14. 1,1-di(trichlorosilyl)ethylene.

References Cited in the file of this patent
UNITED STATES PATENTS 2,642,477    Plueddemann    June 16, 1953

OTHER REFERENCES

Agre: "Jour. Am. Chem. Soc.," vol. 71 (1949), pp. 300–304.

Agre et al.: "Jour. Am. Chem. Soc.," vol. 74 (1952), pp. 3895–3902.